United States Patent [19]
Raaymakers

[11] 3,765,649
[45] Oct. 16, 1973

[54] ARRANGEMENT FOR EFFECTING A RELATIVE LINEAIR DISPLACEMENT BETWEEN A PLURALITY OF LEGS AND A STRUCTURE ADAPTED TO BE MOVED ALONG SAID LEGS

[75] Inventor: Rene A. H. M. Raaymakers, Schiedam, Netherlands

[73] Assignee: N.V. Industrieele Handelscombinate Holland, Rotterdam, Netherlands

[22] Filed: Aug. 16, 1971

[21] Appl. No.: 172,042

[30] Foreign Application Priority Data
Aug. 18, 1970 Netherlands........................ 7012185

[52] U.S. Cl.................................. 254/106, 254/110
[51] Int. Cl............................................. B66f 7/16
[58] Field of Search................... 254/105, 106, 110, 254/95, 93 R, 89

[56] References Cited
UNITED STATES PATENTS
3,411,750  11/1968  Smulders ............................ 254/110
3,372,907  3/1968  Smulders ............................ 254/110
3,517,910  6/1970  Sutton et al. ....................... 254/106

Primary Examiner—Othell M. Simpson
Assistant Examiner—Robert C. Watson
Attorney—Irvin S. Thompson and Robert J. Patch

[57] ABSTRACT

An offshore construction comprises a platform supported on and movable vertically relative to a plurality of legs. At least one of the legs has rack teeth vertically spaced therealong, and the platform supports a crosshead that has a horizontally reciprocable beam that enters between the rack teeth. The crosshead is yieldably urged against the leg carrying the rack teeth and is suspended from the platform by a pair of hydraulic jacks that are interconnected by ball joints to the platform.

4 Claims, 4 Drawing Figures

Patented Oct. 16, 1973
3,765,649
2 Sheets-Sheet 2
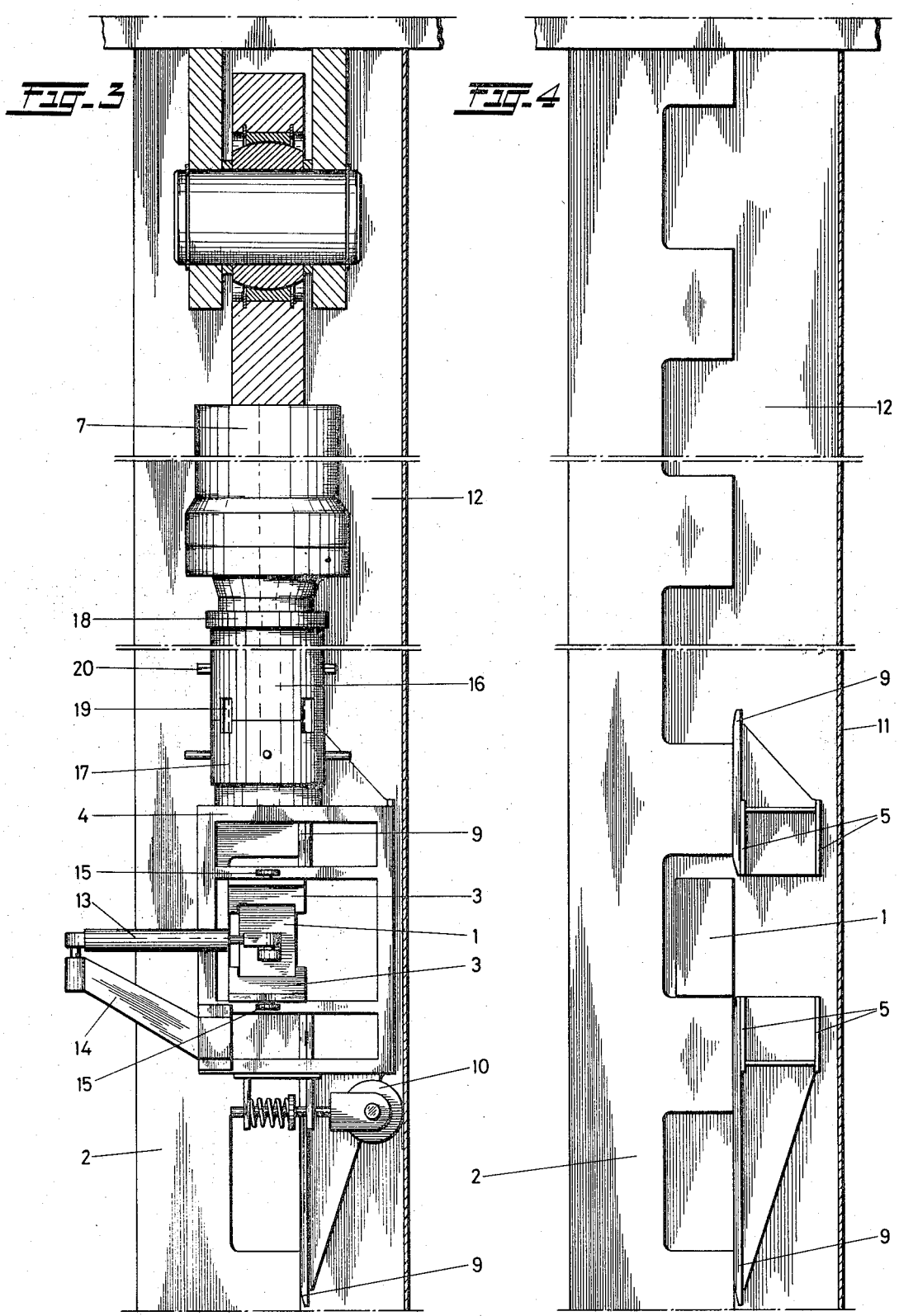

ARRANGEMENT FOR EFFECTING A RELATIVE LINEAIR DISPLACEMENT BETWEEN A PLURALITY OF LEGS AND A STRUCTURE ADAPTED TO BE MOVED ALONG SAID LEGS

The invention relates to an arrangement for effecting a linear displacement between a plurality of legs and a structure adapted to be moved along said legs, such as a platform, the arrangement being such that the legs are provided with at least one rack assembly extending longitudinally of the legs, while the platform is provided and with driving and arresting catch members, each one consisting of a beam-like part which fits between the teeth of the rack assembly, which part is mounted in a crosshead for a slidable movement in directions substantially perpendicular to the rack assembly, and is connected with at least one driving member connected with the crosshead, while the crosshead is guided for slidable movement lengthwise of the rack assembly and is connected with a driving member which is mounted to the platform.

An arrangement of this type is disclosed in U.S. Pat. No. 3,372,907, to which reference may be had for an understanding of the operation of the present invention.

In this known arrangement the crosshead wherein the catch members are situated is guided by a structure which is rigidly connected with the platform.

The disadvantage of this known mechanism is that on account of the relative movements occurring between the legs and the platform, the beam-shaped catch members and the guideways for the crossheads wherein said members are accommodated are subjected to heavy loads caused by the great horizontal frictional forces, so that siad guideways and said crossheads have to be of heavy design, while the frictional surfaces have to be sufficiently extensive. In addition thereto the crossheads have to be constructed such that there will not occur any movements in the connections with the driving members.

These disadvantages are avoided according to the present invention by the fact that the crosshead is guided along the leg and is rigidly attached to the driving member, while the driving member is connected with the platform by means of a ball joint.

In this arragment it is advantageous if the cross-head consists of a housing embracing on three sides the rack assembly, which housing is provided with guide strips engaging the sides of the rack assembly and a guide strip abutting the front of the rack assembly, while in addition thereto the housing is provided with a resilient guide member which is adapted to move along a guideway mounted on the platform in parallel relationship with the rack assembly.

In this manner the crosshead and the beam-shaped catch member disposed therein can follow the movements of the leg without any appreciable frictional forces occurring, while in addition thereto no adverse moments will occur in the driving members.

Each crosshead is preferably connected with two driving members, while in accordance with a further feature of the invention the crosshead comprises two parts, each of which is connected with one of the driving members, the parts being coupled such that they are adapted to move with respect to one another in a direction parallel to the rack assembly, so that if the two driving members act in unison small differences in elevation due to the slant disposition of the rack assembly with respect to the slide member may be taken up as well.

The driving member of the crosshead preferably consists of a hydraulic jack, a supporting locking mechanism being provided between the crosshead and the platform in order to make it possible to remove the pressure from said jack when the platform is erected, this supporting locking mechanism comprises a nut-shaped member which is in engagement with a screw-thread on one of the parts to be supported and two case like members, each of which may be in contact with the nut-shaped member at its one end and with the other part to be supported at its other end. The nut-shaped member may be rigidly connected with the connecting rod of the hydraulic jack.

The invention will now be explained in more detail with reference to the annexed drawings wherein a preferred embodiment of the invention is shown.

FIG. 3 is a side elevational view of the arrangement according to the invention, as seen from the left in FIG. 2.

FIG. 4 shows the same elevational view as shown in FIG. 3, in which certain parts of the catch member are omitted, however.

Figure 1:
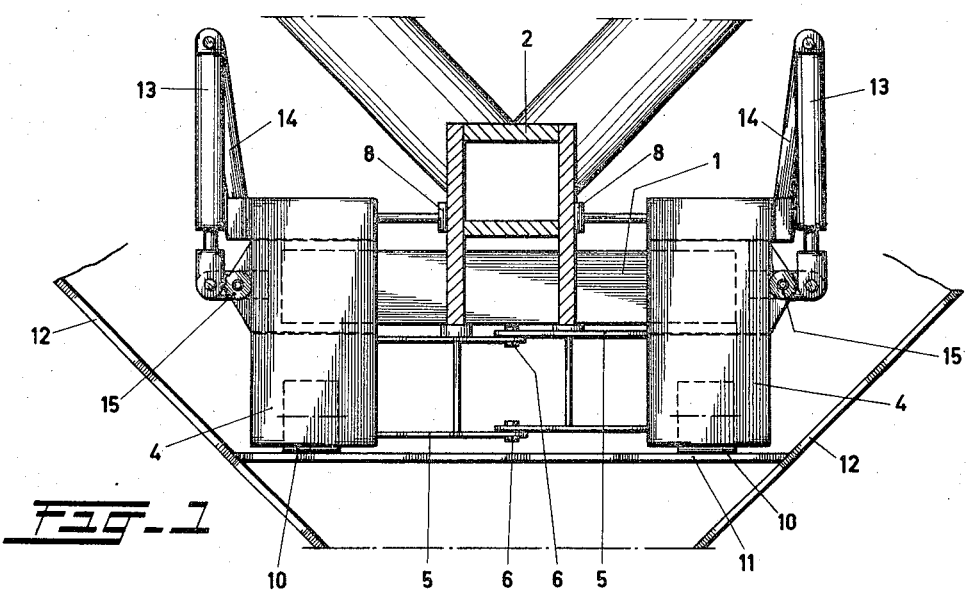
FIG. 1 shows a top elevational view of the arrangement according to the invention.
Figure 2:
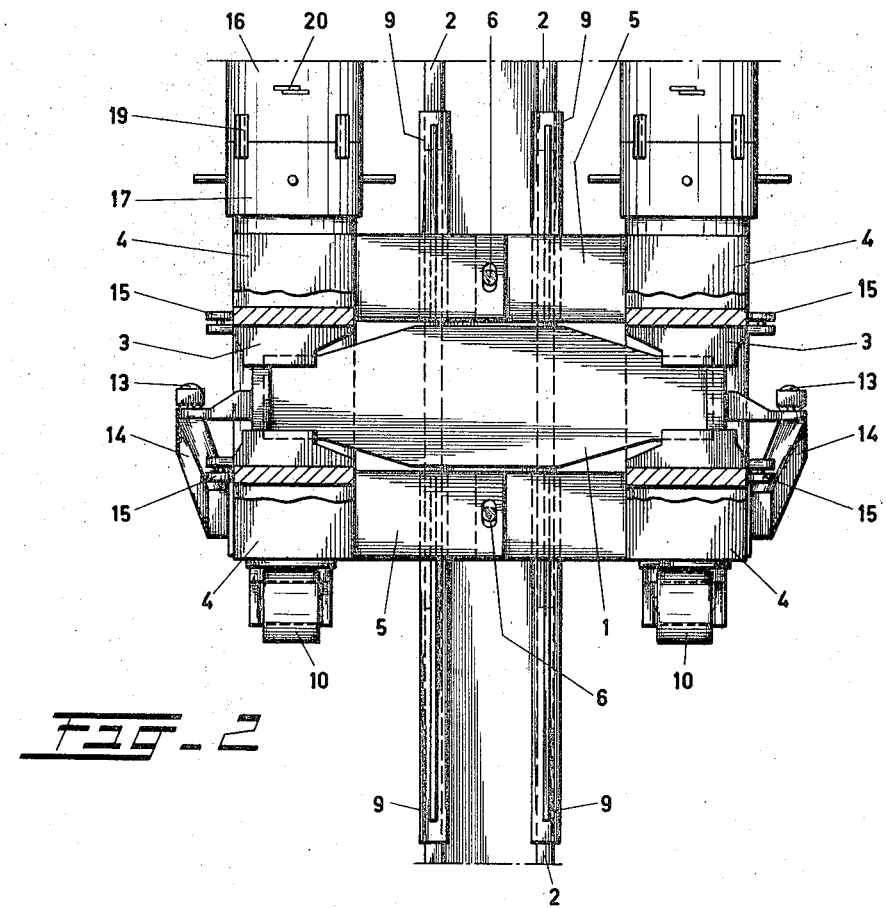
FIG. 2 is a front elevational view of the arrangement according to the invention.

The drawings show a catch member consisting of a locking beam 1, which is adapted to be moved into and out of engagement with the teeth of a rack assembly 2, mounted on one of the corners of a leg. The locking beam 1 is fitted at its ends in sliding shoes 3, by which the locking beam can slide within the crosshead. Said crosshead comprises two parts 4 of an identical construction, which are interconnected by the connecting strips 5, said strips 5 being interconnected by means of the pins 6, extending through slots formed in the connecting strips. Each of the parts 4 of the crosshead is connected with a hydraulic cylinder 7, while the upper end of each of said cylinders 7 is connected with the platform by means of a ball joint, so that the crosshead with the locking beam can move with slight friction in a horizontal direction with respect to the platform. Each of the parts 4 is provided with a guide strip 8 engaging the sides of the rack assembly 2, while in addition thereto there are provided the guidestrips 9, which abut the front of the rack assembly 2, the latter guide strips being interrupted where they are level with the locking beam 1. Each of the parts 4 is moreover provided with resiliently mounted guide rollers 10, which are spring biased against the guideway 11 of the framework 12 which is connected with the platform, so that the guidestrips 9 are in contact with the front of the rack assembly 2 under all conditions.

An actuating cylinder 13 engages the two ends of the locking beam, the other end of said cylinder being connected with the part 4 through the arm 14 so that, with the aid of said cylinder the locking beam 1 can be shifted into and out of engagement with the rack assembly 2. On each of the sliding shoes 3 is mounted a guide roller 15 which serves to retain the sliding shoes inside the parts 4. There is provided a supporting locking device between the platform and the crosshead, said device comprising two case like members 16 which may be positioned between a nut 17 and an abutment 18 on the cylinder 7. The case like members 16 are provided with guides 19, which engage the nut 17, and with connecting members 20 with the aid of which the members 16 may be interconnected. If the pressure in the cylinder has to be removed when the platform is erected, the members 16 are positioned between the cylinder 7 and the nut 17, and the nut 17 is turned into engagement.

The arrangement according to the invention is particularly suited for use in offshore constructions, comprising a plurality of columns or legs standing on the seabed and a platform adapted to be moved along said legs.

What we claim is:

1. In apparatus for effecting a relative linear displacement between a plurality of legs and a body movable along said legs, said legs having at least one rack extending longitudinally thereon and said body having driving and arresting catch members each of which comprises a beam that fits between the teeth of one said rack and is mounted in a crosshead individual to said one rack for slidable movement in directions substantially perpendicular to said one rack, at least one driving member connected with the beam, and means connected to said body for driving said crosshead along said one rack; the improvement comprising guide means engageable between the leg that carries said one rack and said crosshead to guide said crosshead lengthwise of said one rack, and a ball joint interconnecting said body and said driving means thereby to reduce the friction between the catch members and the crossheads.

2. Apparatus as claimed in claim 1, said crosshead comprising a housing embracing three sides of said rack, said housing have guide strips engaging opposite sides of the rack and at least one guide strip engaging the teeth of the rack, a guideway connected to said body and extending parallel to the rack, a guide member carried by said housing and engaging said guideway, and means resiliently urging said guide member into engagement with said guideway thereby to urge the lastmentioned guide strip into engagement with said teeth.

3. Apparatus as claimed in claim 1, there being two said driving means connected to different portions of said crosshead, said crosshead being in two portions interconnected for movement relative to each other.

4. Apparatus as claimed in claim 1, said driving means comprising a hydraulically operated jack.

* * * * *